United States Patent
Shiratory et al.

[11] 3,713,374
[45] Jan. 30, 1973

[54] SHUTTER FOR CAMERAS

[75] Inventors: Yoshitaka Shiratory, Koshigawa-shi, Saitama-ken; Hirokazu Kaneko, Ota-ku, Tokyo, both of Japan

[73] Assignee: Ricoh Co., Ltd., Tokyo, Japan

[22] Filed: Feb. 22, 1971

[21] Appl. No.: 117,658

[30] Foreign Application Priority Data

Feb. 21, 1970 Japan..................................45/16589

[52] U.S. Cl..................................95/59, 95/53 EB
[51] Int. Cl.............................................G03b 9/62
[58] Field of Search....................95/11, 53 R, 55, 59

[56] References Cited

UNITED STATES PATENTS

| 3,033,092 | 5/1962 | Ernisse et al. | 95/59 |
| 3,318,217 | 5/1967 | Ernisse et al. | 95/11 X |
| 3,369,468 | 2/1968 | Sapp, Jr. et al. | 95/11 X |
| 3,526,178 | 9/1970 | Fauth | 95/55 |
| 3,576,156 | 4/1971 | Michatek | 95/11 UX |

Primary Examiner—Joseph F. Peters, Jr.
Attorney—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57] ABSTRACT

A shutter blade drive lever having a projection is pivotally fixed to an integral flat portion bent at a right angle of a shutter release lever which rotates in parallel with a shutter blade having a projection for engagement with the projection of the drive lever. When the drive lever is moved to its energized position against its bias spring, the release lever is not permitted to rotate so that the projection of the drive lever may be kept out of contact of the projection of the shutter blade. When the shutter release lever is rotated so as to permit the drive lever to return to its initial position from the energized position, the projection of the drive lever moves along a path in which it strikes and swings past the projection of the shutter blade so as to rotate the shutter blade against its bias spring and then to return to its initial position, whereby the shutter is opened and closed. The shutter ensures the smooth and reliable operation and avoids the erratic operation.

4 Claims, 6 Drawing Figures

SHUTTER FOR CAMERAS

BACKGROUND OF THE INVENTION

The present invention relates to a single-blade shutter for cameras which is simple in construction and smooth and reliable in operation.

There has been proposed a simple single-blade shutter which has a shutter blade drive member adapted to engage with and disengage from an engaging projection of a single shutter blade and to rotate in a plane perpendicular to a plane of rotation of the shutter blade, so that when the shutter is charged the shutter blade drive member is displaced in the direction perpendicular to the direction of rotation thereof so as to disengage from the engaging projection of the shutter blade and when the shutter is released the shutter blade drive member engages with the engaging projection of the shutter blade and rotates the shutter blade through a predetermined angle. Thereafter the shutter blade drive member swings past the projection of the shutter blade so that the latter may return to its initial position by its return spring. However, the conventional single-blade shutter of the type described has defects that the operation is unstable or unreliable and that an erratic operation tends to occur often because the construction of the conventional single-blade shutter is such that the engaging projection of the shutter blade must be displaced in the direction perpendicular or normal to the direction of rotation of the shutter blade. Therefore, the shutter blade drive member must be provided with a clearance in the axial direction thereof or made of an elastic material so as to permit the displacement of the engaging projection of the shutter blade. This tends to cause the unreliable and erratic operations.

It is therefore the primary object of the present invention to provide an improved single-blade shutter for cameras which is reliable and smooth in operation overcoming the problems described of the conventional single-blade shutter.

SUMMARY OF THE INVENTION

In brief, a single-blade shutter for cameras in accordance with the present invention is characterized by comprising a single shutter blade having an upright arm integrally formed therewith, a shutter release lever rotatable in a plane in parallel with a plane of rotation of the shutter blade and having a bent surface integrally formed therewith and extended substantially perpendicular to the plane of rotation of the release lever and a shutter blade drive lever pivotally fixed to the bent surface of the release lever and provided with an integral upright projection for engagement with the upright arm of the shutter blade. The shutter release lever is not permitted to rotate so as to keep the upright projection of the shutter blade drive lever when the latter is rotated to its energized position against its return spring, but permitted to rotate when the shutter blade drive lever returns to its initial position under the force of its return spring so that the upright projection of the shutter blade drive lever strikes the upright arm of the shutter blade thereby driving the shutter blade against its bias spring to open the shutter and then to return to its initial position under the force of its return spring.

According to the present invention, it is not necessary to displace the shutter blade drive lever in the direction at a right angle relative to the direction of rotation thereof, so that the actuation of the shutter blade is very smooth and positive and that the erratic operation of the shutter may be completely prevented.

The present invention will become more apparent from the following description of the preferred embodiment thereof taken in conjunction with the accompanying drawings.

Figure 1:
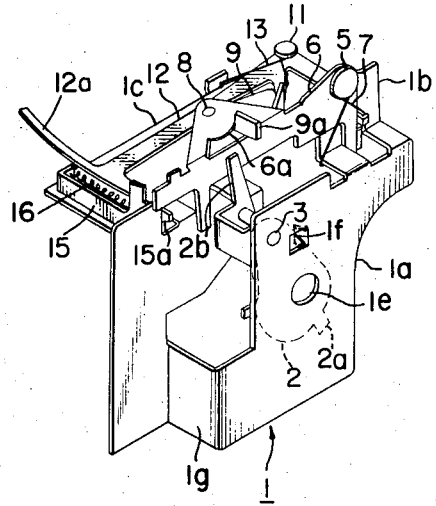
FIG. 1 is a front perspective view of a single-blade shutter in accordance with the present invention before it is charged.
Figure 2:
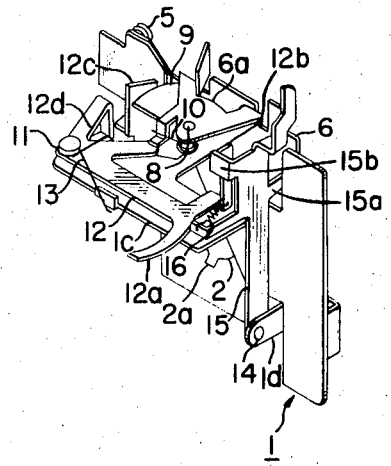
FIG. 2 is a rear perspective view thereof.
Figure 4:
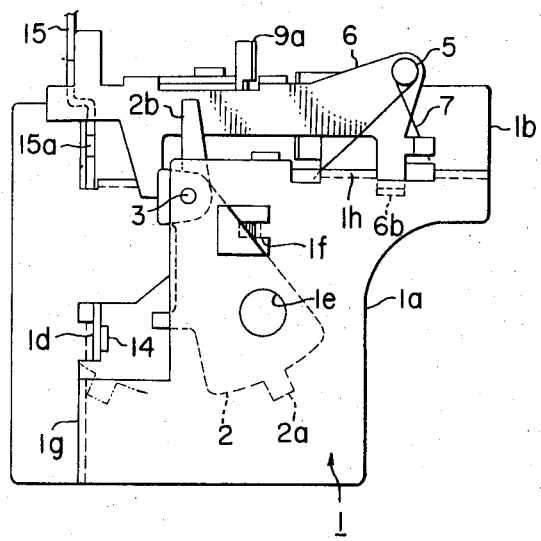
FIG. 4 is a front view thereof.

DESCRIPTION OF THE PREFERRED EMBODIMENT:

The preferred embodiment of the present invention will be described as being applied to a camera using a 126 size film having perforation holes. A shutter base plate 1 has flat portions 1a and 1b integrally formed with the base plate 1, a flat portion 1c and a bracket-like member 1d both of which are also integrally formed and in parallel with the optical axis of a camera lens of the camera into which the shutter is incorporated. One end of a single shutter blade 2 is pivotally fixed to the flat portion 1a by means of a pin 3 and serves to open and close an aperture 1e formed in the flat portion 1a. A spring 4 fitted over the pin 3 serves to normally bias the shutter blade 2 in the counter-clockwise direction in FIGS. 1 and 4. This counter-clockwise rotation of the shutter blade 2 may be stopped by a detent or protrusion 1f struck out of the flat portion 1a. The shutter blade 2 has a projection 2a integrally formed at the free end of the shutter blade and an upright arm 2b integrally formed at the opposite end of said blade. When the shutter blade 2 is opened, that is when it is rotated in the clockwise direction as will be described hereinafter, the projection 2a engages with a leg portion 1g supporting the flat portion 1a so as to stop the rotation of the shutter blade 2 and the upright arm 2b engages with a shutter blade driving member to be described hereinafter.

A release lever 6 is rotatably carried by a pin 5 mounted upon the flat portion 1b of the base plate 1 and a spring 7 is located between the release lever 6 and the flat portion 1b so as to normally bias the release lever 6 in the clockwise direction. The release lever 6 has a bent portion 6a and a projection 6b formed integrally. A shutter blade drive lever 9 is carried around a pivot 8 mounted upon the bent portion 6a of the release lever and a spring 10 is loaded between the lever 9 and the release lever 6 so as to normally bias the shutter blade drive lever 9 in the counterclockwise direction. It should be noted that the spring 10 is stronger than the return spring 4 for the shutter blade 2. The shutter blade drive lever 9 has an upright projection 9a integrally formed and extended through an opening formed in the bent portion 6a as seen from FIG. 1.

A control lever 12 is pivotally carried around a pivot 11 mounted upon the flat portion 1c of the base plate 1, and a spring 13 is loaded between the control lever 12 and the flat portion 1c so as to normally bias the control lever 11 in the clockwise direction. The control lever 12 has a projection 12a and bent portions 12b, 12c and 12d integrally formed therewith. When the shutter is assembled in the camera, the projection 12a is positioned so as to engage with the perforation holes of the 126 size film; the bent portion 12c is positioned so as to engage with the arcuate side edge of the shutter blade drive lever 9 in the form of a sector; and the bent portion 12d extends into the path of rotation of the bent portion 6b of the release lever 6.

Figure 5:
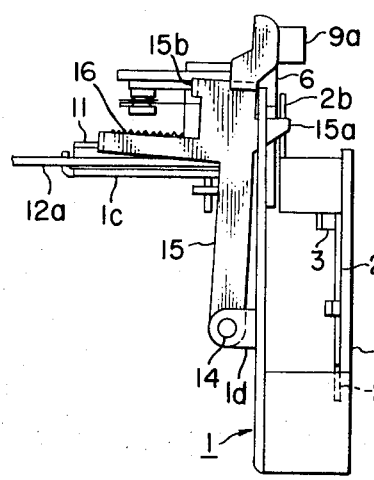
FIG. 5 is a side view thereof.

An engaging lever 15 is pivotally carried around a pivot 14 mounted on the bracket-like member 1d of the base plate as best shown in FIG. 5, and a spring 16 is loaded between the engaging lever 15 and the bent portion 12b of the control lever 12. The engaging lever 15 has front and rear projections 15a and 15b integrally formed, and the front projection 15a is adapted to engage with the release lever 6 while the rear projection 15b with the bent portion 12b of the control lever 12.

In the positions shown in FIGS. 1–5, the clockwise rotation of the release lever 6 under the force of the spring 7 (See FIG. 4) is prevented because of the engagement of the bent portion 6b with the bent portion 1h of the base plate 1. The counterclockwise rotation of the shutter blade drive lever 9 under the force of the spring 10 is prevented by the engagement of the straight side edge of the shutter blade drive lever 9 with the bent portion 6c of the release lever 6 as seen from FIG. 3. The clockwise rotation of the control lever 12 under the force of the spring 13 is prevented by the engagement of the bent portion 12c of the control lever 12 with the arcuate side edge of the shutter blade drive lever 9 as viewed from FIG. 3. Under these conditions, even when the release lever 6 is depressed so as to rotate in the counterclockwise direction, it cannot rotate because the front projection 15a of the engaging lever 15 is extending into the path of rotation of the release lever 6 as viewed from FIGS. 1 and 4.

Figure 3:
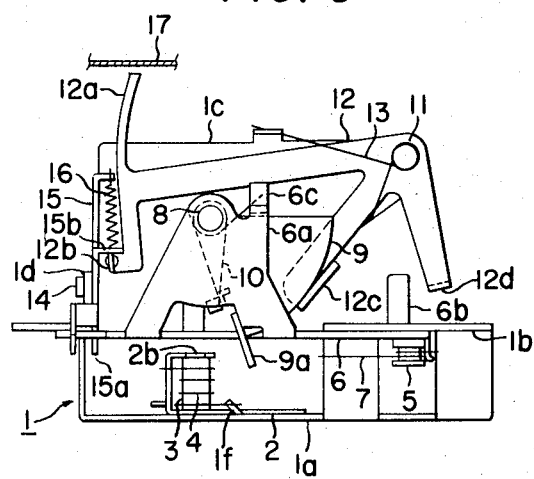
FIG. 3 is a top view thereof.

When the upright bent portion 9a of the shutter blade drive lever 9 is rotated in the clockwise direction against the spring 10 in FIG. 3, the bent portion 12c of the control lever 12 is disengaged from the arcuate side edge of the shutter blade drive lever 9 under the force of the spring 13 and then engaged with the straight side edge of the shutter blade drive lever 9. Now the shutter blade drive lever 9 is held in the position shown in FIG. 6.

Figure 6:
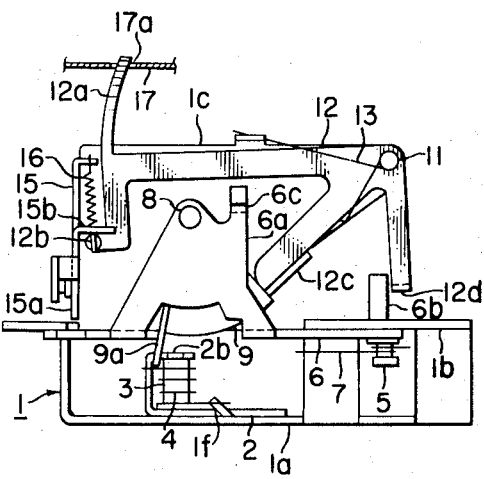
FIG. 6 is a view similar to FIG. 3 and shows the shutter charged.

When the film 17 is advanced by a film transport mechanism (not shown) and the perforation hole 17a of the film engages with the projection 12a of the control lever 12, the latter is rotated in the clockwise direction to a position shown in FIG. 6, whereby the charging of the shutter is accomplished. In this position the bent portion 12b of the control lever 12 engages with the rear projection 15b of the engaging lever 15 so as to rotate it in the counterclockwise direction in FIG. 5. As a consequence the front projection 15a is moved away from the path of rotation of the release lever 6, whereby the rotation of the lever 6 is now permitted. Upon rotation of the release lever 6, the projection 6b drives the bent portion 12d of the control lever 12 so as to rotate it in the counterclockwise direction. Now the upright projection 12c is moved away from the straight side edge of the shutter blade drive lever 9. When the shutter blade drive lever 9 is about to be released, the upright projection 9a thereof is moved to a position shown in FIG. 6 where it may strike against the arm 2b of the shutter blade so as to drive it in the clockwise direction. Now the upright projection 9a of the drive lever 9 kicks the upright arm 2a of the shutter blade so as to rotate the shutter blade 2 in the clockwise direction against the spring 4, whereby the aperture 1e is opened.

After the projection 2a of the shutter blade 2 has engaged with the leg portion 1g of the base plate 1, the shutter blade is returned to its initial position under the force of the return spring 4. Upon release of the pressure applied to the release lever 6, it is returned also to its initial position under the force of the spring 7 so that the engaging lever 15 is returned also to its initial position under the bias of the spring 16.

In the embodiment described above, the control lever 12 has been described as being used as the control member for controlling the position of the 126 size film, but it is understood that the present invention may be also applied to any camera using a film in any size such as 35-mm when these members are separately provided.

What is claimed is:

1. A single-blade shutter for cameras comprising
   a. a single shutter blade provided with an integral arm, biased by a return spring and pivotally fixed to a shutter base plate perpendicular to the optical axis of a camera lens of a camera,
   b. a shutter release lever rotatable in a plane in parallel with the plane of rotation of said shutter blade and provided with a bent surface substantially perpendicular to said plane of rotation of said shutter release lever, and
   c. a shutter blade drive lever pivotally fixed to said bent surface of said shutter release lever, said shutter blade drive lever having an initial position and a bias spring urging the shutter blade drive lever toward said initial position, said shutter blade drive lever provided with an integral engaging portion for engagement with said arm of said shutter blade, said engaging portion of said shutter blade drive lever moving along a path in which said engaging portion does not engage with said arm when said shutter blade drive lever rotates against its bias spring, and said engaging portion engaging with said arm to thereby rotate said single shutter blade to open the shutter when said shutter blade drive lever returns to its initial position under the force of its bias spring.

2. A single blade shutter as in claim 1 including a control lever pivoted for rotation in a plane parallel to a plane of rotation of said shutter blade drive lever and having a first bent portion for engaging said shutter blade drive lever to hold the shutter blade drive lever in a cocked position at which said shutter blade drive lever is held against the urging of its bias spring and away from its initial position.

3. A single blade shutter as in claim 2 wherein the control lever is provided with a second bent portion, and wherein the shutter release lever is provided with a first projection, said first projection engaging the control lever second projection to rotate the control lever out of engagement with the shutter blade drive lever, whereby the bias spring of the shutter blade drive lever is allowed to return the shutter blade drive lever from its cocked position to its initial position.

4. A single blade shutter as in claim 3 wherein said control lever is provided with a film-engaging projection, said film engaging projection engaging a perforation in a film contained in the camera when the first bent portion of the control lever engages said shutter blade drive lever to hold it at said cocked position.

* * * * *